US012182476B2

(12) United States Patent
Urabe et al.

(10) Patent No.: US 12,182,476 B2
(45) Date of Patent: Dec. 31, 2024

(54) VOICE NOTIFICATION SYSTEM, VOICE NOTIFICATION METHOD, AND RECORDING MEDIUM

(71) Applicant: Panasonic Intellectual Property Management Co., Ltd., Osaka (JP)

(72) Inventors: Hiroki Urabe, Osaka (JP); Kazuhiro Kuroyama, Osaka (JP); Sara Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 42 days.

(21) Appl. No.: 17/911,916

(22) PCT Filed: Dec. 21, 2021

(86) PCT No.: PCT/JP2021/047365
§ 371 (c)(1),
(2) Date: Sep. 15, 2022

(87) PCT Pub. No.: WO2023/013093
PCT Pub. Date: Feb. 9, 2023

(65) Prior Publication Data
US 2023/0229386 A1    Jul. 20, 2023

(30) Foreign Application Priority Data

Aug. 4, 2021    (JP) ................................. 2021-128587

(51) Int. Cl.
*G08B 3/00* (2006.01)
*G06F 3/16* (2006.01)
*H04L 12/28* (2006.01)

(52) U.S. Cl.
CPC .......... *G06F 3/167* (2013.01); *H04L 12/2823* (2013.01)

(58) Field of Classification Search
CPC ............................ G06F 3/167; H04L 12/2823
See application file for complete search history.

(56) References Cited

U.S. PATENT DOCUMENTS 11,069,358 B1 *   7/2021   Harper .................... G10L 15/26
11,100,930 B1 *   8/2021   Salem ..................... G10L 15/08
(Continued)

FOREIGN PATENT DOCUMENTS

EP    3831548 A1    6/2021
JP    2002-139244 A    5/2002
(Continued)

OTHER PUBLICATIONS

International Search Report issued on Mar. 8, 2022 in International Patent Application No. PCT/JP2021/047365.
(Continued)

*Primary Examiner* — Quang Pham
(74) *Attorney, Agent, or Firm* — Rimon P.C.

(57) ABSTRACT

A voice notification system is a system that causes a talking device to provide a voice notification of information about a notification target that is an information source device about which information is notified by the talking device or an information source service about which information is notified by the talking device. The system includes: a change detector that detects a change regarding notification details or a change regarding a notification method; and a notifier that causes the talking device to provide a voice notification of information about the change regarding the notification details or the change regarding the notification method when the change regarding the notification details or the change regarding the notification method is detected.

11 Claims, 19 Drawing Sheets

(56) References Cited

U.S. PATENT DOCUMENTS

| | | | | |
|---|---|---|---|---|
| 2005/0114775 A1* | 5/2005 | Inui | ................ | G06F 9/453 |
| | | | | 715/705 |
| 2005/0152557 A1* | 7/2005 | Sasaki | ................ | H04S 7/302 |
| | | | | 381/59 |
| 2005/0210517 A1* | 9/2005 | Hirose | ................ | H04L 41/22 |
| | | | | 725/80 |
| 2011/0316698 A1* | 12/2011 | Palin | ................ | H04L 43/04 |
| | | | | 340/540 |
| 2015/0170665 A1* | 6/2015 | Gundeti | ................ | G06F 3/167 |
| | | | | 704/270.1 |
| 2015/0187194 A1* | 7/2015 | Hypolite | ................ | G08B 17/10 |
| | | | | 340/628 |
| 2016/0212534 A1* | 7/2016 | Le Nerriec | ................ | H04R 3/12 |
| 2016/0212535 A1* | 7/2016 | Le Nerriec | ................ | H04R 27/00 |
| 2017/0093536 A1* | 3/2017 | Yoganathan | ................ | H04W 12/068 |
| 2018/0102127 A1* | 4/2018 | Izawa | ................ | G10L 15/22 |
| 2018/0181369 A1* | 6/2018 | Tanaka | ................ | H04S 7/302 |
| 2018/0189025 A1* | 7/2018 | Tanaka | ................ | H04S 7/30 |
| 2019/0079855 A1* | 3/2019 | Dewitt | ................ | G06F 8/70 |
| 2020/0135202 A1* | 4/2020 | Zawa | ................ | G10L 15/22 |
| 2020/0349942 A1 | 11/2020 | Ahn et al. | | |
| 2020/0357396 A1 | 11/2020 | Fujii et al. | | |
| 2021/0004621 A1 | 1/2021 | Nakai et al. | | |
| 2021/0065703 A1 | 3/2021 | Maeng et al. | | |
| 2021/0209710 A1* | 7/2021 | Shetty | ................ | G06Q 10/107 |
| 2022/0293097 A1* | 9/2022 | Jekeswaran | ................ | G06F 3/167 |
| 2023/0054530 A1* | 2/2023 | Kakemura | ................ | H04M 3/42382 |
| 2023/0319190 A1* | 10/2023 | Dickins | ................ | H04R 3/02 |
| | | | | 379/406.06 |

FOREIGN PATENT DOCUMENTS

| | | | |
|---|---|---|---|
| JP | 2005-276165 A | | 10/2005 |
| JP | 2016151838 A | * | 8/2016 |
| JP | 2017-151718 A | | 8/2017 |
| JP | 2018-063328 A | | 4/2018 |

OTHER PUBLICATIONS

Extended European Search Report dated Oct. 1, 2024 issued in the corresponding European Patent Application No. 21929419.6.

* cited by examiner

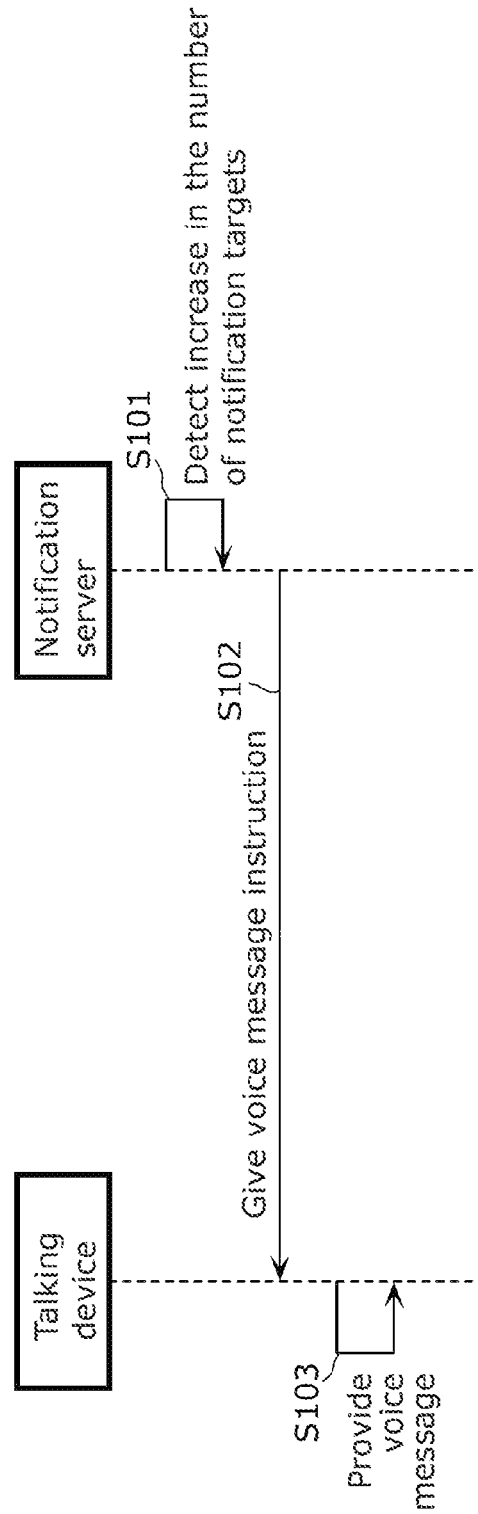

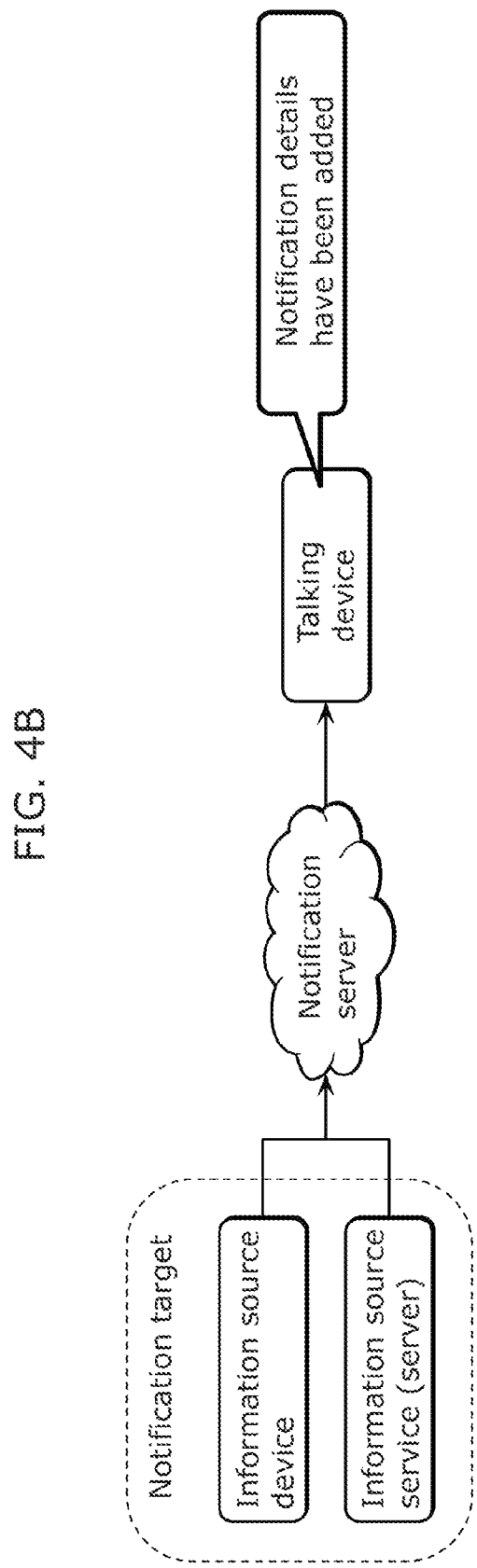

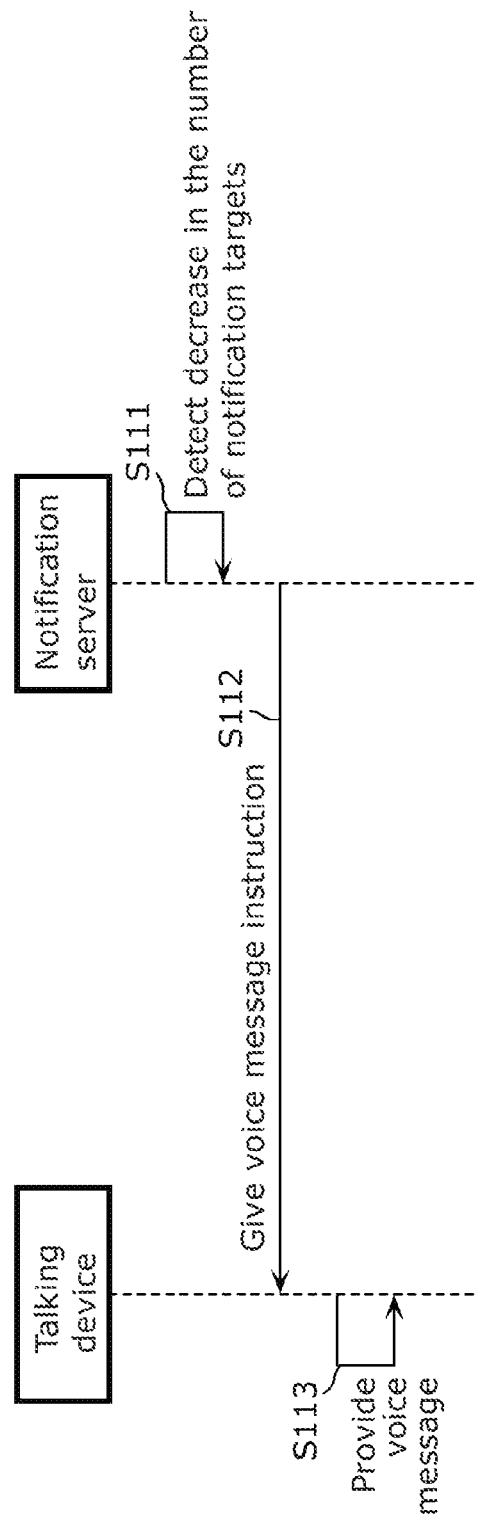

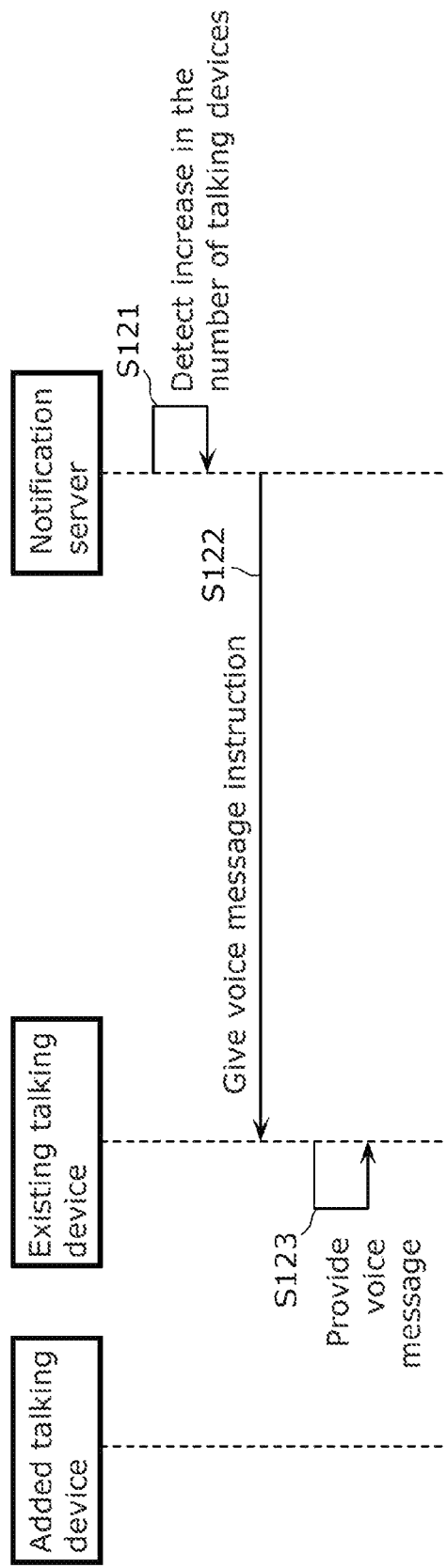

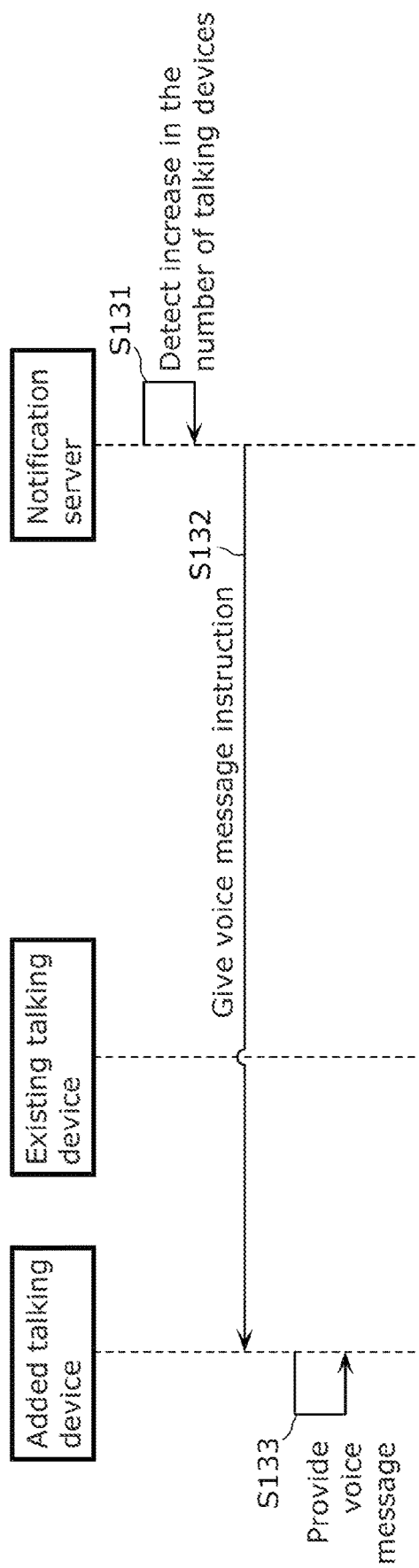

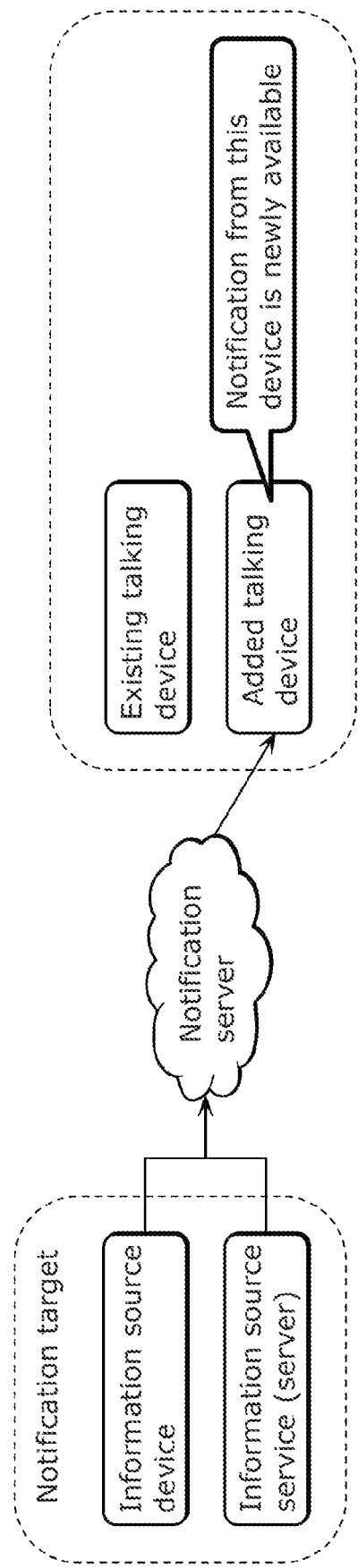

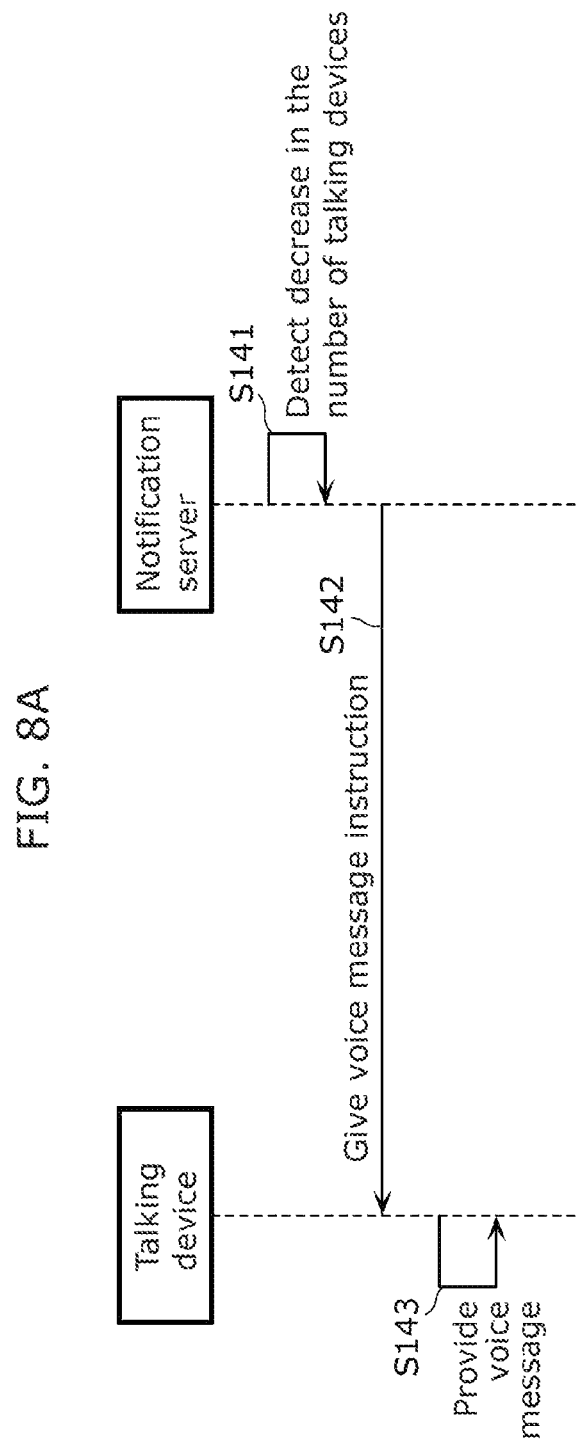

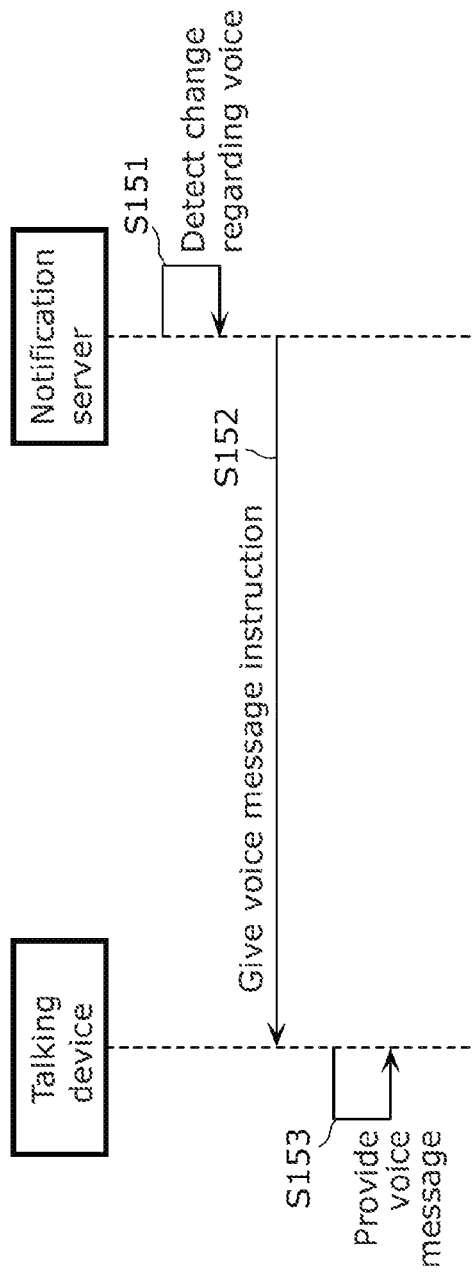

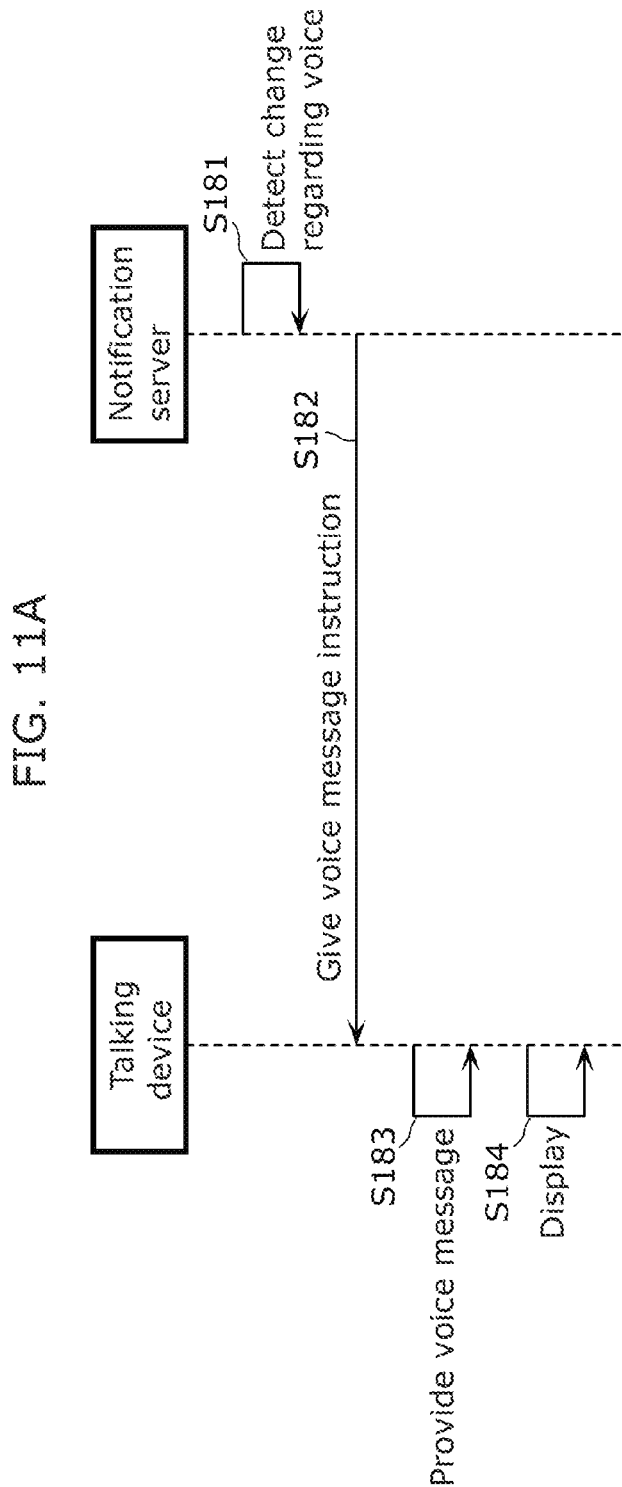

VOICE NOTIFICATION SYSTEM, VOICE NOTIFICATION METHOD, AND RECORDING MEDIUM

CROSS-REFERENCE OF RELATED APPLICATIONS

This application is the U.S. National Phase under 35 U.S.C. § 371 of International Patent Application No. PCT/JP2021/047365, filed on Dec. 21, 2021, which in turn claims the benefit of Japanese Patent Application No. 2021-128587, filed on Aug. 4, 2021, the entire disclosures of which Applications are incorporated by reference herein.

TECHNICAL FIELD

The present disclosure relates to a voice notification system and so forth that cause a talking device to provide a voice notification of information about a notification target that is an information source device about which information is notified by the talking device or an information source service about which information is notified by the talking device.

BACKGROUND ART

Patent Literature (PTL) 1 discloses, for example, a technology of causing a talking device to provide a voice notification of information about a home appliance, etc.

CITATION LIST

Patent Literature

[PTL 1] Japanese Unexamined Patent Application Publication No. 2017-151718

SUMMARY OF INVENTION

Technical Problem

When a change occurs regarding notification details or a notification method relating to a home appliance, a service, etc., for example, a user may not notice such change in some cases.

In view of the above, the present disclosure provides a voice notification system and so forth that enable a user to easily notice a change regarding notification details or a change regarding a notification method.

Solution to Problem

The voice notification system in the present disclosure is a voice notification system that causes a talking device to provide a voice notification of information about a notification target that is an information source device about which information is notified by the talking device or an information source service about which information is notified by the talking device. Such voice notification system includes: a change detector that detects a change regarding notification details or a change regarding a notification method; and a notifier that causes the talking device to provide a voice notification of information about the change regarding the notification details or the change regarding the notification method when the change regarding the notification details or the change regarding the notification method is detected.

The voice notification method in the present disclosure is a voice notification method of causing a talking device to provide a voice notification of information about a notification target that is an information source device about which information is notified by the talking device or an information source service about which information is notified by the talking device. Such voice notification method includes: detecting a change regarding notification details or a change regarding a notification method; and causing the talking device to provide a voice notification of information about the change regarding the notification details or the change regarding the notification method when the change regarding the notification details or the change regarding the notification method is detected.

The recording medium in the present disclosure is a non-transitory computer-readable recording medium having recorded thereon a program for causing a computer to execute the foregoing voice notification method.

Advantageous Effects of Invention

With the voice notification system and so forth in the present disclosure, it is possible to enable a user to easily notice a change regarding notification details or a change regarding a notification method.

BRIEF DESCRIPTION OF DRAWINGS

FIG. 4A is a sequence diagram showing an example of the operations performed by a notification server and a talking device when an increase in the number of notification targets is detected.

FIG. 4B is a diagram showing an example of the details of a voice message to be provided when an increase in the number of notification targets is detected.

FIG. 5A is a sequence diagram showing an example of the operations performed by the notification server and a talking device when a decrease in the number of notification targets is detected.

FIG. 6A is a sequence diagram showing an example of the operations performed by the notification server and a talking device after an increase in the number of talking devices is detected.

FIG. 7A is a sequence diagram showing an example of the operations performed by the notification server and a talking device when an increase in the number of talking devices is detected.

FIG. 7B is a diagram showing an example of the details of a voice message to be provided when an increase in the number of talking devices is detected.

FIG. 8A is a sequence diagram showing an example of the operations performed by the notification server and a talking device when a decrease in the number of talking devices is detected.

FIG. 9A is a sequence diagram showing an example of the operations performed by the notification server and a talking device when a change regarding a voice is detected.

FIG. 11A is a sequence diagram showing an example of the operations performed by the notification server and a talking device when a change is detected.

DESCRIPTION OF EMBODIMENT

An exemplary embodiment will now be described herein in detail with reference to the drawings where appropriate. Note, however, that a detailed description more than necessary may be omitted. For example, a detailed description of a well-known matter or repetitive description of substantially the same configuration may be omitted. This is to prevent the following description from becoming unnecessarily redundant and to facilitate the understanding of those skilled in the art.

Also note that the inventors provide the accompanying drawings and the following description for those skilled in the art to fully understand the present disclosure, and thus that these do not intend to limit the subject recited in the claims.

Embodiment

The following describes the embodiment with reference to FIG. 1 through FIG. 12B.

Figure 1:
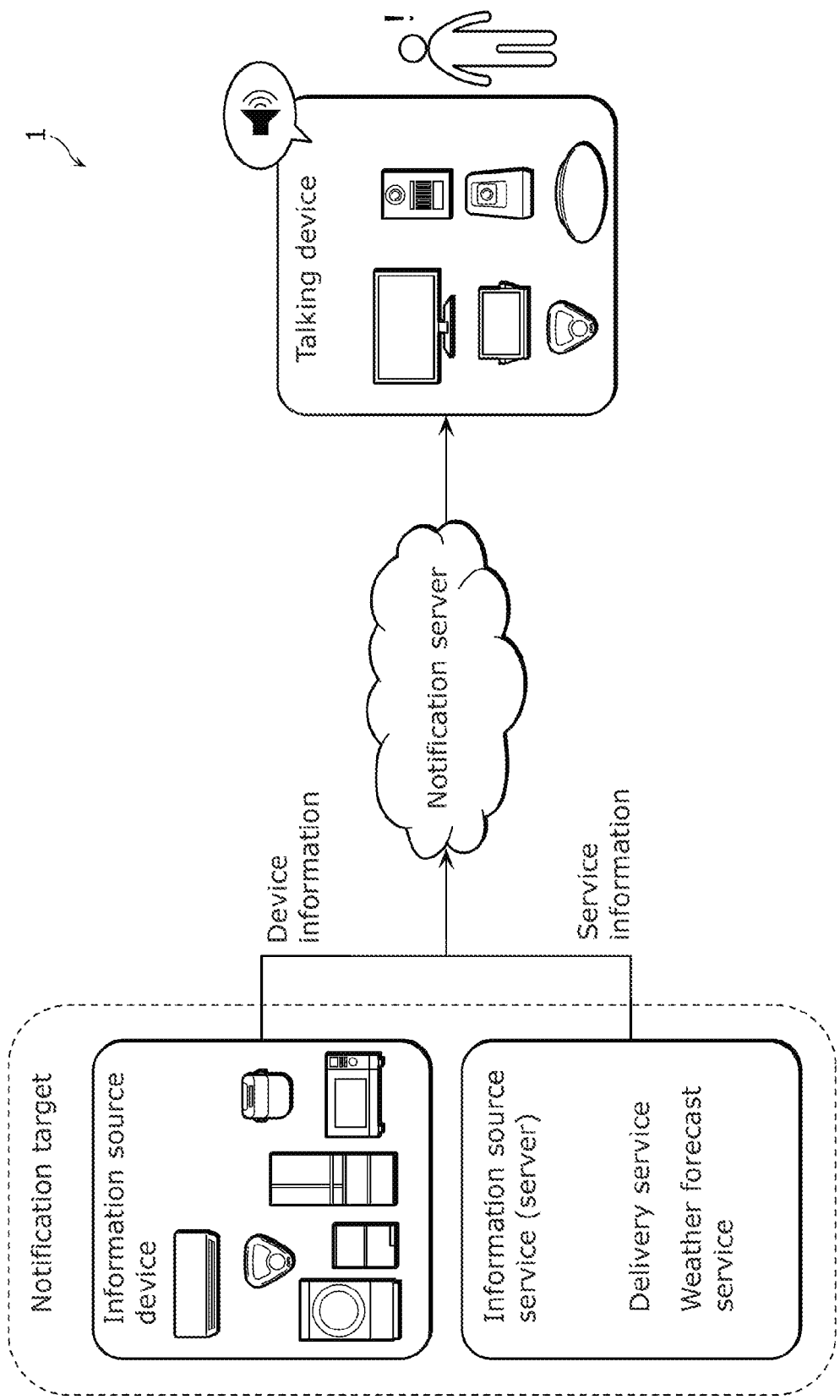
FIG. 1 is a diagram showing an example of the overall configuration of a voice notification system according to an embodiment.

FIG. 1 is a diagram showing an example of the overall configuration of voice notification system 1 according to the embodiment.

Voice notification system 1 is a system that causes a talking device to provide a voice notification of information about a notification target.

A notification target is an information source device about which information is notified by a talking device or an information source service (more specifically, a service provided from a server, etc.) about which information is notified by a talking device. The information source device is, for example, a home appliance owned by the user (air conditioner, washing machine, robot vacuum cleaner, refrigerator, rice cooker, microwave oven, etc.). A talking device provides a notification of device information about a home appliance (status of the home appliance, operating history of the home appliance, operating schedule of the home appliance, etc.). The information source service is, for example, a service to be provided to the user (delivery service, weather forecast service, etc.). A talking device provides a notification of service information about the service (history of service provision, schedule of service provision, details of the service, etc.).

Each talking device is a device capable of providing a voice notification of information about a notification target. The talking device is, for example, a device including a speaker. More specific examples of the talking device include a television, a laptop computer, a robot vacuum cleaner, an intercommunication system, a telephone, and a lighting device.

A notification server is a server device connected to notification targets and talking devices. The notification server obtains device information and service information from a notification target. Then, depending on the information obtained, the notification server causes a talking device to provide a voice notification of information about the notification target. This enables the user to check the information, in the form of voice, about the notification target that is, for example, an information source device or an information source service.

When there is a new increase or decrease in the number of information source devices or information source services as a notification target, for example, a change regarding the notification details occurs. When notification of information about a microwave oven becomes newly available, for example, the notification details will include the information about the microwave oven, and thus a change regarding the notification details occurs. When notification of information about a refrigerator becomes unavailable, for example, the notification details will exclude the information about the refrigerator, and thus a change regarding the notification details occurs. Also, when there is an increase or decrease in the number of talking devices capable of providing a voice notification of information about a notification target, a change in the notification methods occurs. When an intercommunication system has become able to provide a voice message indicating information about a notification target, for example, a notification method using the intercommunication system becomes available, and thus a change regarding the notification methods occurs. When a telephone has become unable to provide a voice message indicating information about a notification target, for example, a notification method using the telephone becomes unavailable, and thus a change regarding the notification methods occurs. When there is a change regarding the voice used for notification, a change regarding the notification methods occurs. When there is a change regarding the voice tone of the voice used for notification, for example, a notification method using such voice tone becomes available, and thus a change regarding the notification methods occurs.

As described above, changes regarding the notification details include a change regarding the notification targets (more specifically, an increase or decrease in the number of notification targets) and changes regarding the notification methods include a change regarding the talking devices (more specifically, an increase or decrease in the number of talking devices) or a change regarding the voice used for notification.

When a change regarding the notification details or the notification methods occurs, the user may not notice such change in some cases. This is because such change has not been notified or merely displayed on a display device only to be missed by the user. In such cases, the user can fail to use a newly added notification target or talking device, or will be surprised at a change regarding the notification details or the notification methods that has occurred without knowing it. The user can also be subjected to a disadvantage due to, for example, a decrease in the number of notification targets or talking devices that has happened without knowing it.

Figure 2:
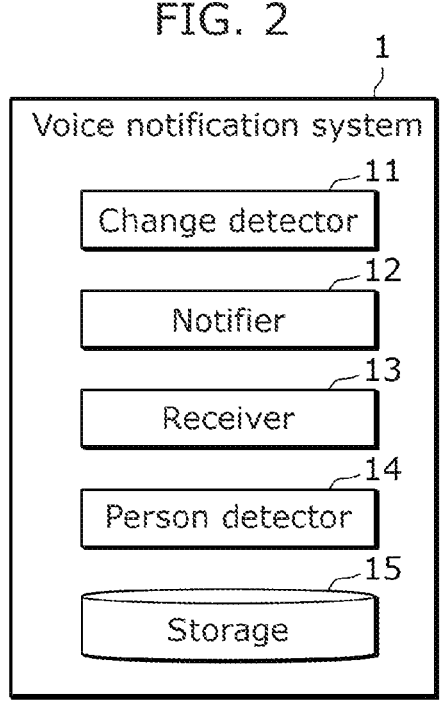
FIG. 2 is a diagram showing an example of the functional elements included in the voice notification system according to the embodiment.

In view of the above, the following describes voice notification system 1 that enables the user to easily notice a change regarding the notification details or a change regarding the notification methods. With reference to FIG. 2, the functional configuration will be first described that enables the user to easily notice a change regarding the notification details or a change regarding the notification methods.

FIG. 2 is a diagram showing an example of the functional elements included in voice notification system 1 according to the embodiment.

Voice notification system 1 includes change detector 11, notifier 12, receiver 13, person detector 14, and storage 15. A computer including a processor, a communication interface, a user interface, a memory, etc. is included in voice notification system 1. Such computer is, for example, a notification server, a notification target, or a talking device. For example, change detector 11, notifier 12, receiver 13, and storage 15 are included in the notification server, and person detector 14 is included in a talking device. The memory, examples of which include a read only memory (ROM) and a random access memory (RAM), is capable of storing a program executed by the processor. Change detector 11, notifier 12, and receiver 13 can be implemented by the processor, etc. executing the program stored in the memory. Storage 15 can be implemented by, for example, a memory. Storage 15 may be a memory different from the memory that stores the program.

Change detector 11 detects a change regarding the notification details or a change regarding the notification methods. The operation performed by change detector 11 will be described in detail later.

Notifier 12 causes a talking device to provide a voice notification of information about a change regarding the notification details or a change regarding the notification methods when the change regarding the notification details or the change regarding the notification methods is detected. The operation performed by notifier 12 will be described in detail later.

Receiver 13 receives activation of the change regarding the notification details or the change regarding the notification methods. The operation performed by change receiver 13 will be described in detail later.

Person detector 14 detects whether a person is present around a talking device. Person detector 14 is, for example, a human sensor, etc. provided in a talking device. Note that person detector 14 can be any units capable of detecting whether a person is present around the talking device. Person detector 14 may detect that a person is present around the talking device, when the talking device is operated, by, for example, obtaining information indicating that the talking device has been operated. Also, person detector 14 may not be provided in a talking device, and thus may be a human sensor, etc. provided around a talking device.

Storage 15 stores, for example, an information source list. The information source list, which is a list of notification targets, is updated in accordance with an increase and decrease in the number of notification targets. When a notification target is added or deleted, for example, the notification server may obtain, from such notification target or a device, etc. that manages the notification target, information indicating the notification target to be added or deleted to update the information source list. Alternatively, the information source list may be updated by the foregoing notification target or device, etc., or may be manually updated by a manager, etc. of the notification server.

Storage 15 stores, for example, a talking device list. The talking device list, which is a list of talking devices, is updated in accordance with an increase and decrease in the number of talking devices. When a talking device is added or deleted, for example, the notification server may obtain, from such talking device or a device, etc. that manages the talking device, information indicating the talking device to be added or deleted to update the talking device list. Alternatively, the talking device list may be updated by the foregoing talking device or device, etc., or may be manually updated by the manager, etc. of the notification server.

Storage 15 stores, for example, a voice list. The voice list, which is a list of voices used for notification, is updated when the setting of a voice element used for notification is added or deleted. The voice element is, for example, a voice tone, a language, a pitch, a speed, a volume, an accent, or a dialect of a voice used for notification. When a voice element is added or deleted, for example, the notification server may obtain, from a device, etc. that manages the voices used for notification, information indicating the voice element to be added or deleted to update the voice list. Alternatively, the voice list may be updated by the foregoing device, etc., or may be manually updated by the manager, etc. of the notification server.

Note that the information source list, the talking device list, and the voice list may be stored in mutually different memories.

The following describes in detail the operation performed by voice notification system 1.

Figure 3:
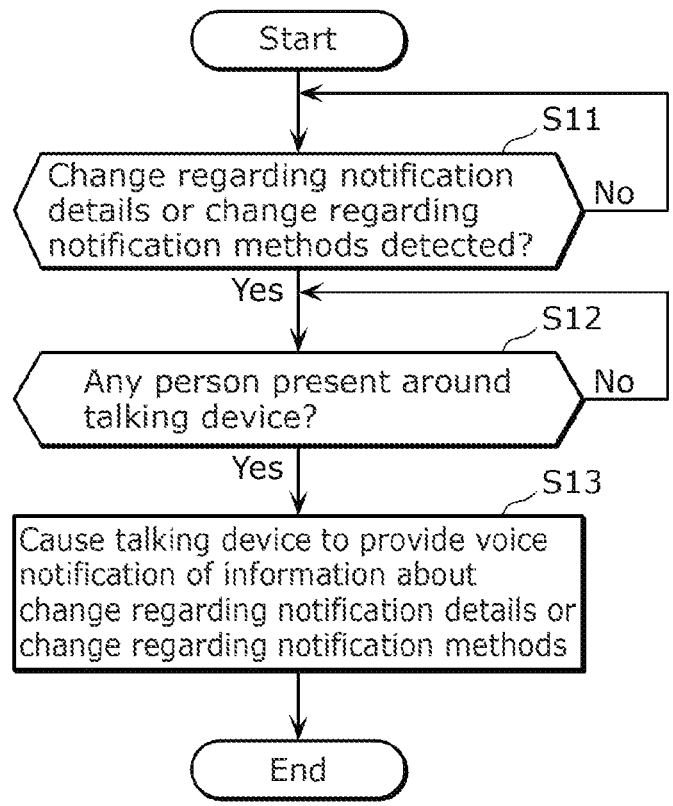
FIG. 3 is a flowchart showing an example of the operation performed by the voice notification system according to the embodiment.

FIG. 3 is a flowchart showing an example of the operation performed by voice notification system 1 according to the embodiment.

First, notifier 12 determines whether a change regarding the notification details or a change regarding the notification methods is detected (Step S11). For example, when the information source list is updated, that is, when there is an increase or decrease in the number of notification targets, change detector 11 detects a change regarding the notification details and notifier 12 determines that a change regarding the notification details is detected. When the talking device list is updated, that is, when there is an increase or decrease in the number of talking devices, for example, change detector 11 detects a change regarding the notification methods and notifier 12 determines that a change regarding the notification methods is detected. When the voice list is updated, that is, when there is a change regarding the voice used for notification, for example, change detector 11 detects a change regarding the notification methods and notifier 12 determines that a change regarding the notification methods is detected.

When no change regarding the notification details or the notification methods is detected (No in Step S11), the process of step S11 is repeated until a change regarding the notification details or a change regarding the notification methods is detected.

When a change regarding the notification details or a change regarding the notification methods is detected (Yes in S11), notifier 12 determines whether a person is present around at least one of the talking devices (step S12). For example, when detecting a person, person detector 14 notifies the notification server of that. Accordingly, notifier 12 determines that a person is present around at least one of the talking devices.

When no person is present around at least one of the talking devices (No in step S12), the process of step S12 is repeated until a person is detected around at least one of the talking devices.

When a person is present around at least one of the talking devices (Yes in step S12), notifier 12 causes the at least one of the talking devices to provide a voice notification of information about the change regarding the notification details or the change regarding the notification methods (step S13).

When an increase in the number of notification targets is detected as a change regarding the notification details (change regarding the notification targets), for example, notifier 12 may cause a talking device to provide a voice notification of information about the increase in the number of notification targets. This will be described with reference to FIG. 4A and FIG. 4B.

FIG. 4A is a sequence diagram showing an example of the operations performed by the notification server and a talking device when an increase in the number of notification targets is detected.

FIG. 4B is a diagram showing an example of the details of a voice message to be provided when an increase in the number of notification targets is detected.

As shown in FIG. 4A, the notification server detects an increase in the number of notification targets (step S101), and gives a voice message instruction to the talking device to provide a voice message indicating information about the increase in the number of notification targets (step S102). The voice message instruction may include, for example, the sound source of a voice to be spoken or a uniform resource locator (URL), etc. for downloading the sound source of a voice to be spoken. Alternatively, the sound sources of voices to be spoken may be preliminarily stored in each talking device, and the voice message instruction may include an instruction for specifying a sound source from which a voice is to be reproduced among the sound sources stored in the talking device.

In response to this, the talking device provides a voice message indicating the information about the increase in the number of notification targets (step S103). For example, as shown in FIG. 4B, the talking device may provide a voice message saying "Notification details have been added". The details of the voice message may include the type of the notification target added. When a microwave oven is added as a notification target, for example, the talking device may provide a voice message saying "Notification of information about the microwave oven is newly available". The details of the voice message may also include specific notification details that are added. When a microwave oven is added as a notification target, for example, the talking device may provide a voice message saying "Notification of cooking completion and errors of the microwave oven is newly available". The details of the voice message may also include a guidance for an operation required to activate an increase in the number of notification targets. For example, the talking device may provide a voice message saying "Notification details have been added. Please perform the operation for activating the increase from the setting screen".

When a decrease in the number of notification targets is detected as a change regarding the notification details (change regarding the notification targets), for example, notifier 12 may cause a talking device to provide a voice notification of information about the decrease in the number of notification targets. This will be described with reference to FIG. 5A and FIG. 5B.

FIG. 5A is a sequence diagram showing an example of the operations performed by the notification server and a talking device when a decrease in the number of notification targets is detected.

Figure 5B:
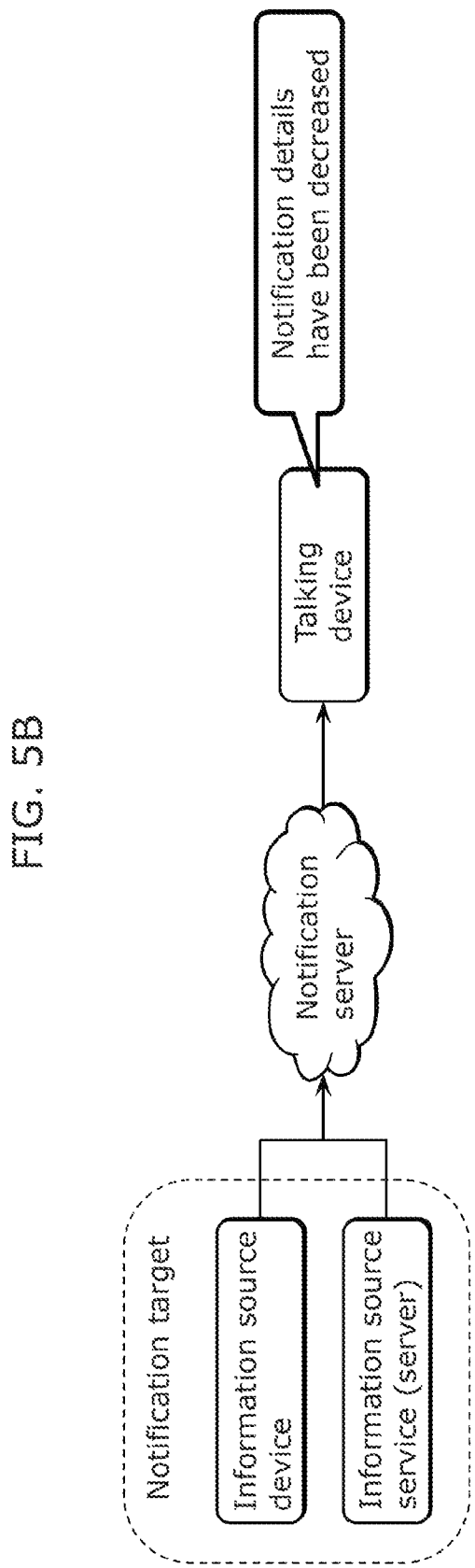
FIG. 5B is a diagram showing an example of the details of a voice message to be provided when a decrease in the number of notification targets is detected.

FIG. 5B is a diagram showing an example of the details of a voice message to be provided when a decrease in the number of notification targets is detected.

As shown in FIG. 5A, the notification server detects a decrease in the number of notification targets (step S111), and gives a voice message instruction to the talking device to provide a voice message indicating information about the decrease in the number of notification targets (step S112).

In response to this, the talking device provides a voice message indicating the information about the decrease in the number of notification targets (step S113). For example, as shown in FIG. 5B, the talking device may provide a voice message saying "Notification details have been decreased". The details of the voice message may include the type of the notification target deleted. When a microwave oven as a notification target is deleted, for example, the talking device may provide a voice message saying "Notification of information about the microwave oven has become unavailable". The details of the voice message may also include specific notification details that are deleted. When a microwave oven as a notification target is deleted, for example, the talking device may provide a voice message saying "Notification of cooking completion and errors of the microwave oven has become unavailable". The details of the voice message may also include a guidance for prompting to check the decrease in the number of notification targets (e.g., microwave oven). For example, the talking device may provide a voice message saying "Notification of information about the microwave oven has become unavailable. Please check the settings of the microwave oven". When the cause of the decrease in the number of notification targets is identifiable, a voice notification of such cause may be provided.

Note that a temporary network malfunction, etc. can cause repeated decrease and increase in the number of notification targets. In such a case, when a voice notification of information about an increase and decrease in the number of notification targets is frequently provided to the user every time such increase and decrease occurs, the user can feel bothersome. In view of this, notifier 12 may cause a talking device to provide a voice notification of information about a decrease in the number of notification targets when no increase in the number of notification targets is detected for a predetermined period after the decrease in the number of notification targets is detected. The predetermined period is not limited to a specific period and thus may be set as appropriate.

Note that when a plurality of talking devices are present, notifier 12 may cause such plurality of talking devices to provide a voice notification of information about a change regarding the notification details.

When an increase in the number of talking devices is detected as a change regarding the notification methods (change regarding the talking devices), for example, notifier 12 may cause at least one of the talking devices after the increase to provide a voice notification of information about the increase in the number of talking devices. This will be described with reference to FIG. 6A through FIG. 7B. First, with reference to FIG. 6A and FIG. 6B, an example case will be described where an existing talking device is caused to provide a voice notification of information about an increase in the number of talking devices.

FIG. 6A is a sequence diagram showing an example of the operations performed by the notification server and a talking device after an increase in the number of talking devices is detected.

Figure 6B:
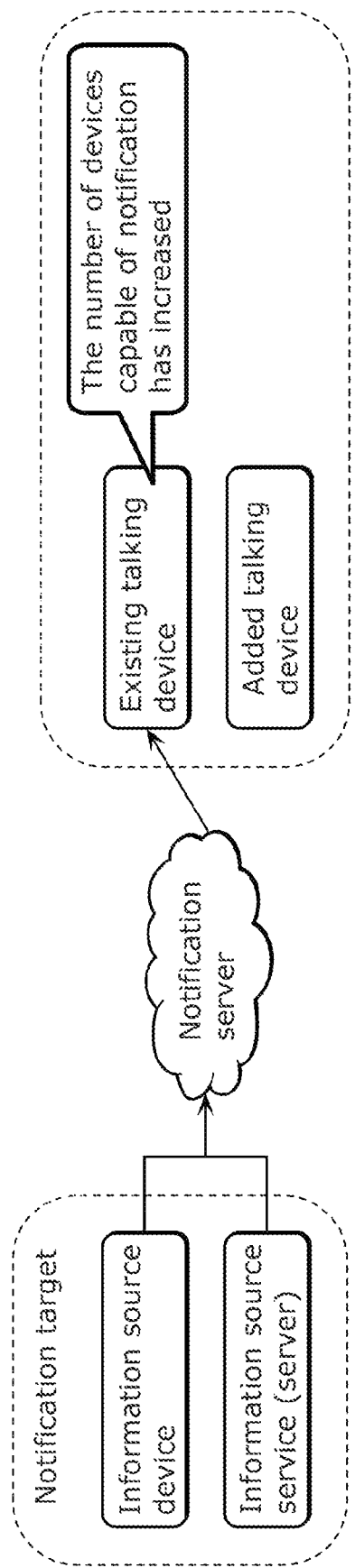
FIG. 6B is a diagram showing an example of the details of a voice message to be provided when an increase in the number of talking devices is detected.

FIG. 6B is a diagram showing an example of the details of a voice message to be provided when an increase in the number of talking devices is detected.

As shown in FIG. 6A, the notification server detects an increase in the number of talking devices (step S121), and gives a voice message instruction to an existing talking device to provide a voice message indicating information about the increase in the number of talking devices (step S122).

In response to this, the existing talking device provides a voice message indicating the information about the increase in the number of talking devices (step S123). For example, as shown in FIG. 6B, the existing talking device may provide a voice message saying "The number of devices capable of notification has increased". The details of the voice message may include the type of the talking device added. When a television is added as a talking device, for example, the existing talking device may provide a voice message saying "Notification is newly available from the television". The details of the voice message may also include a guidance for an operation required to activate an increase in the number of talking devices. For example, the existing talking device may provide a voice message saying "A device capable of notification is added. Please perform the operation for activating the increase from the setting screen".

Next, with reference to FIG. 7A and FIG. 7B, an example case will be described where a newly added talking device is caused to provide a voice notification of information about the increase in the number of talking devices.

FIG. 7A is a sequence diagram showing an example of the operations performed by the notification server and a talking device when an increase in the number of talking devices is detected.

FIG. 7B is a diagram showing an example of the details of a voice message to be provided when an increase in the number of talking devices is detected.

As shown in FIG. 7A, the notification server detects an increase in the number of talking devices (step S131), and gives a voice message instruction to the added talking device to provide a voice message indicating information about the increase in the number of talking devices (step S132).

In response to this, the added talking device provides a voice message indicating the information about the increase in the number of talking devices (step S133). For example, as shown in FIG. 7B, the added talking device may provide a voice message saying "Notification from this device is newly available". The details of the voice message may include the type of the talking device added. When a television is added as a talking device, for example, such added talking device may provide a voice message saying "Notification is newly available from this television". The details of the voice message may also include a guidance for an operation required to activate an increase in the number of talking devices. For example, the added talking device may provide a voice message saying "Notification is newly available from this device. Please perform the operation for activating the increase from the setting screen".

Note that when an increase in the number of talking devices is detected, notifier 12 may cause a plurality of talking devices after the increase to provide a voice notification of information about the increase in the number of talking devices.

When a decrease in the number of talking devices is detected as a change regarding the notification methods (change regarding the talking devices), for example, notifier 12 may cause at least one of the talking devices after the decrease to provide a voice notification of information about the decrease in the number of talking devices. This will be described with reference to FIG. 8A and FIG. 8B.

FIG. 8A is a sequence diagram showing an example of the operations performed by the notification server and a talking device after a decrease in the number of talking devices is detected.

Figure 8B:
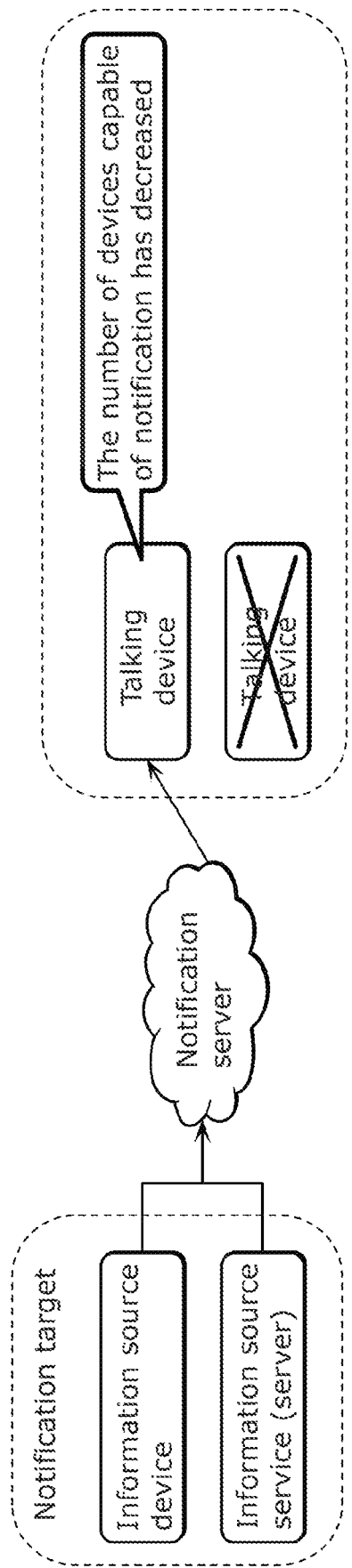
FIG. 8B is a diagram showing an example of the details of a voice message to be provided when a decrease in the number of talking devices is detected.

FIG. 8B is a diagram showing an example of the details of a voice message to be provided when a decrease in the number of talking devices is detected.

As shown in FIG. 8A, the notification server detects a decrease in the number of talking devices (step S141), and gives a voice message instruction to a talking device to provide a voice message indicating the information about the decrease in the number of talking devices (step S142).

In response to this, the talking device provides a voice message indicating the information about the decrease in the number of talking devices (step S143). For example, as shown in FIG. 8B, the talking device may provide a voice message saying "The number of devices capable of notification has decreased". The details of the voice message may include the type of the talking device deleted. When a television as a talking device is deleted, for example, the talking device may provide a voice message saying "Notification from the television has become unavailable". The details of the voice message may also include a guidance for prompting to check the decrease in the number of talking devices. For example, the talking device may provide a voice message saying "The number of devices capable of notification has decreased. Please check the settings". When the cause of the decrease in the number of talking devices is identifiable, a voice notification of such cause may be provided.

Note that a temporary network malfunction, etc. can cause repeated decrease and increase in the number of talking devices. In such a case, when a voice notification of information about an increase and decrease in the number of talking devices is frequently provided to the user every time such increase and decrease occurs, the user can feel bothersome. In view of this, notifier 12 may cause at least one of the talking devices after the decrease to provide a voice notification of information about the decrease in the number of talking devices when no increase in the number of talking devices is detected for a predetermined period after the decrease in the number of talking devices is detected. The predetermined period is not limited to a specific period and thus may be set as appropriate.

Note that when a plurality of talking devices are still present after the number of talking devices decreases, notifier 12 may cause such plurality of talking devices to provide a voice notification of information about a change regarding the notification details.

When a change regarding the voice used for notification is detected as a change regarding the notification methods, for example, notifier 12 may cause talking devices to provide a voice notification of information about the change regarding the voice used for notification. This will be described with reference to FIG. 9A and FIG. 9B.

FIG. 9A is a sequence diagram showing an example of the operations performed by the notification server and a talking device when a change regarding a voice is detected.

Figure 9B:
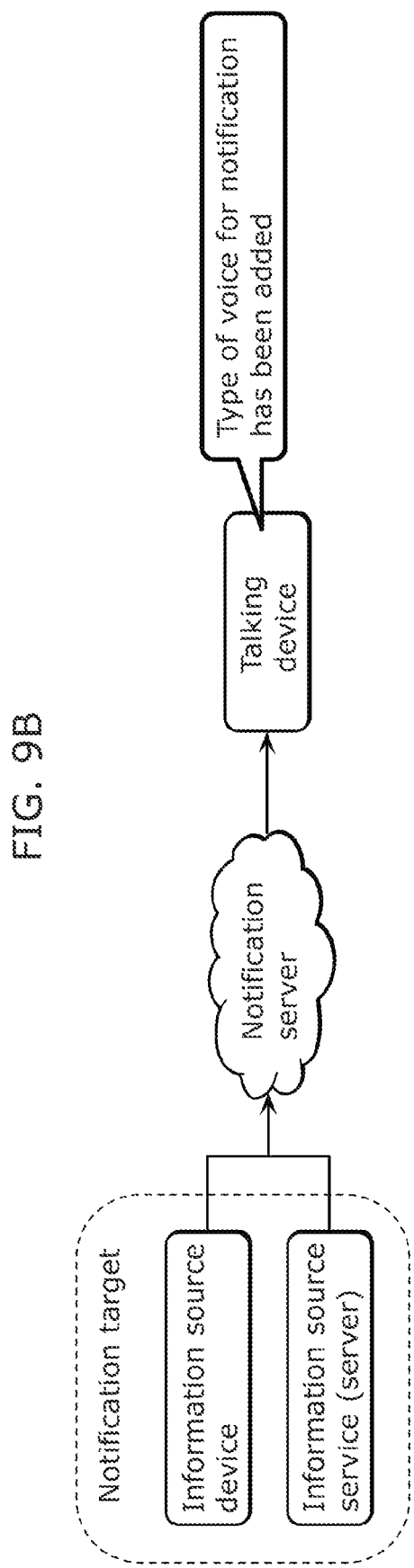
FIG. 9B is a diagram showing an example of the details of a voice message to be provided when a change regarding a voice is detected.

FIG. 9B is a diagram showing an example of the details of a voice message to be provided when a change regarding a voice is detected.

As shown in FIG. 9A, the notification server detects a change regarding the voice used for notification (step S151), and gives a voice message instruction to a talking device to provide a voice message indicating information about the change regarding the voice used for notification (step S152). Examples of the change regarding the voice used for notification include a change of a voice tone (character), a language, a pitch (frequency characteristics), a speed, a volume, an accent, and a dialect.

In response to this, the talking device provides a voice message indicating the information about the change regarding the voice used for notification (step S153). For example, as shown in FIG. 9B, the talking device may provide a voice message saying "type of voice for notification has been added". The details of the voice message may include a voice element of the voice changed (e.g., voice tone, language, pitch, speed, volume, accent, or dialect). For example, the talking device may provide a voice message saying "A voice tone of the voices for notification has been added" and "A voice tone of the voices for notification has been deleted". The details of the voice message may also include a guidance for an operation required to activate a change regarding the voice used for notification. For example, the talking device may provide a voice message saying "A voice tone of the voices for notification has been added. You can change the voice tone from the setting screen". Note that a portion of a voice element such as "voice tone" may be, for example, language, pitch, speed, volume, accent, or dialect.

When a change regarding the voice used for notification is detected, notifier 12 may cause a talking device to provide, using the changed voice, a voice notification of information about the change regarding the voice used for notification. For example, the talking device may provide a voice notification on which the added voice element is reflected, such as "This male voice has been added".

The information about a change regarding the notification details or a change regarding the notification methods may include an inquiry about activation of the change regarding the notification details or the change regarding the notification methods. This will be described with reference to FIG. 10A and FIG. 10B.

Figure 10A:
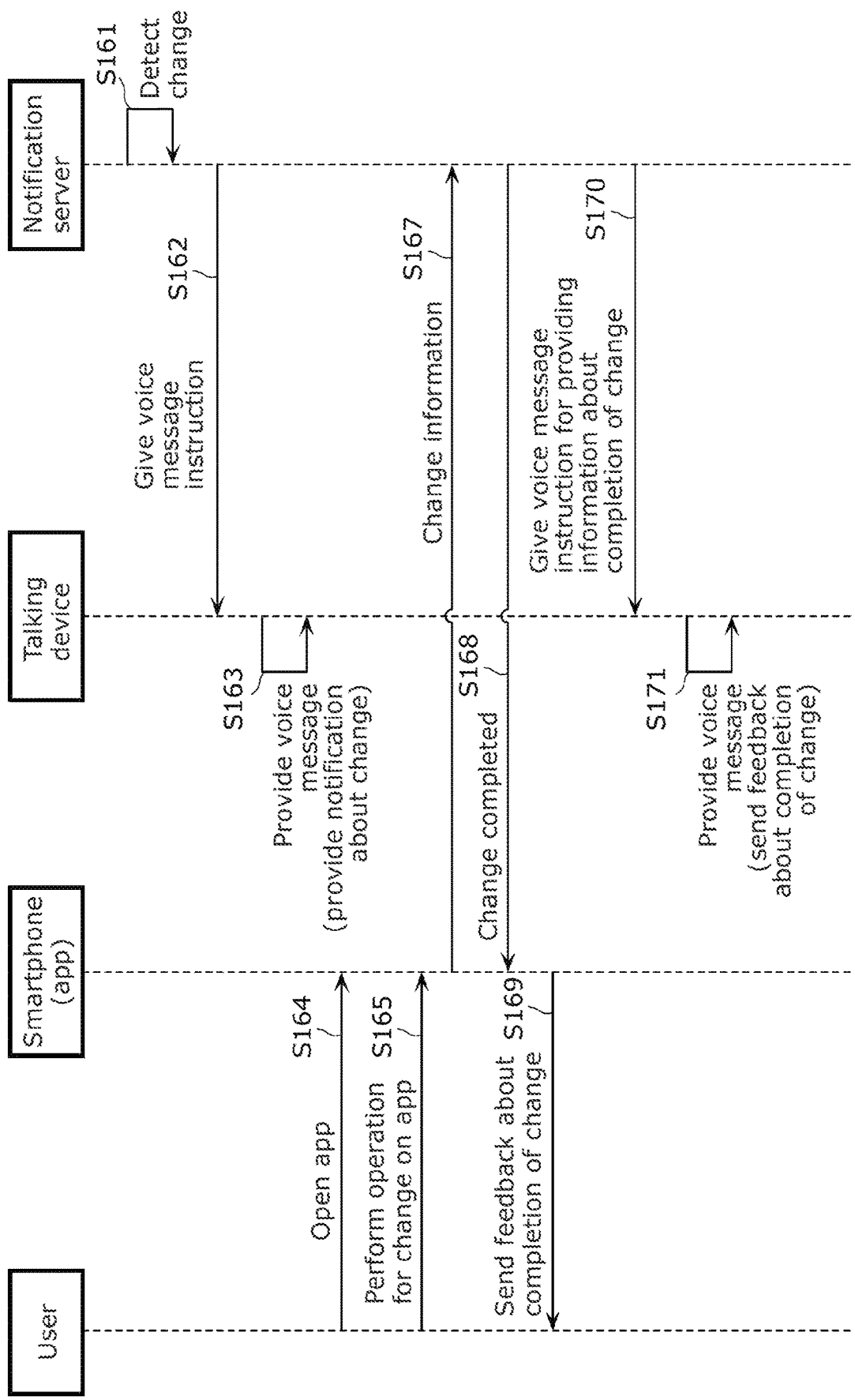
FIG. 10A is a sequence diagram showing an example of the operations performed by the notification server, a talking device, and a smartphone when a change is detected.

FIG. 10A is a sequence diagram showing an example of the operations performed by the notification server, a talking device, and a smartphone when a change is detected.

Figure 10B:
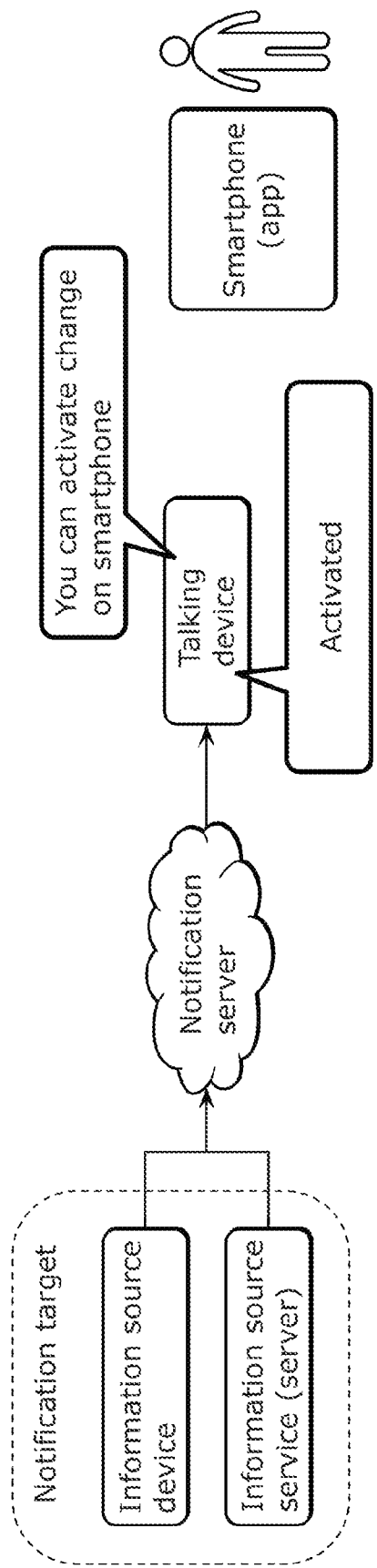
FIG. 10B is a diagram showing an example of the details of a voice message that includes an inquiry about activation of a change when the change is detected.

FIG. 10B is a diagram showing an example of the details of a voice message that includes an inquiry about activation of a change when the change is detected.

As shown in FIG. 10A, the notification server detects a change regarding the notification details or a change regarding the notification methods (step S161), and gives a voice message instruction to the talking device to provide a voice message indicating information about such change (step S162).

The talking device provides a voice message indicating the information about the change (step S163). For example, as shown in FIG. 10B, the talking device may provide a voice message saying "You can activate the change on your smartphone". The talking device may provide a voice message saying, for example, "Notification of information about a microwave oven is newly available. You can activate the change on the smartphone app". Also, the talking device may provide a voice message saying, for example, "A male voice is newly added. You can change the voice on the smartphone app". At this time, the notification server or the talking device may instruct the user's smartphone to provide a push notification.

The user (who has heard the voice message from the talking device or seen the push notification) opens the smartphone app (step S164), and performs the operation for the change (operation for activating the change) on the app (step S165).

The smartphone sends, to the notification server, change information indicating that the operation for activating the change has been performed (step S167). Accordingly, the notification server activates the change.

The notification server sends, to the smartphone, information about the completion of the change (step S168), in response to which the smartphone sends feedback to the user about the completion of the change (step S169).

The notification server gives a voice message instruction to the talking device to provide a voice message indicating information about the completion of the change (step S170).

In response to this, the talking device provides a voice message indicating the information about the completion of the change (step S171). For example, as shown in FIG. 10B, the talking device may provide a voice message saying "activated".

Each talking device may include, for example, a display device such as a display. When a change regarding the notification details or a change regarding the notification methods is detected, notifier 12 may further cause a notification of information about the change regarding the notification details or the change regarding the notification methods to be provided from the display device in the form of text, image, or video. This will be described with reference to FIG. 11A and FIG. 11B.

FIG. 11A is a sequence diagram showing an example of the operations performed by the notification server and a talking device when a change is detected.

Figure 11B:
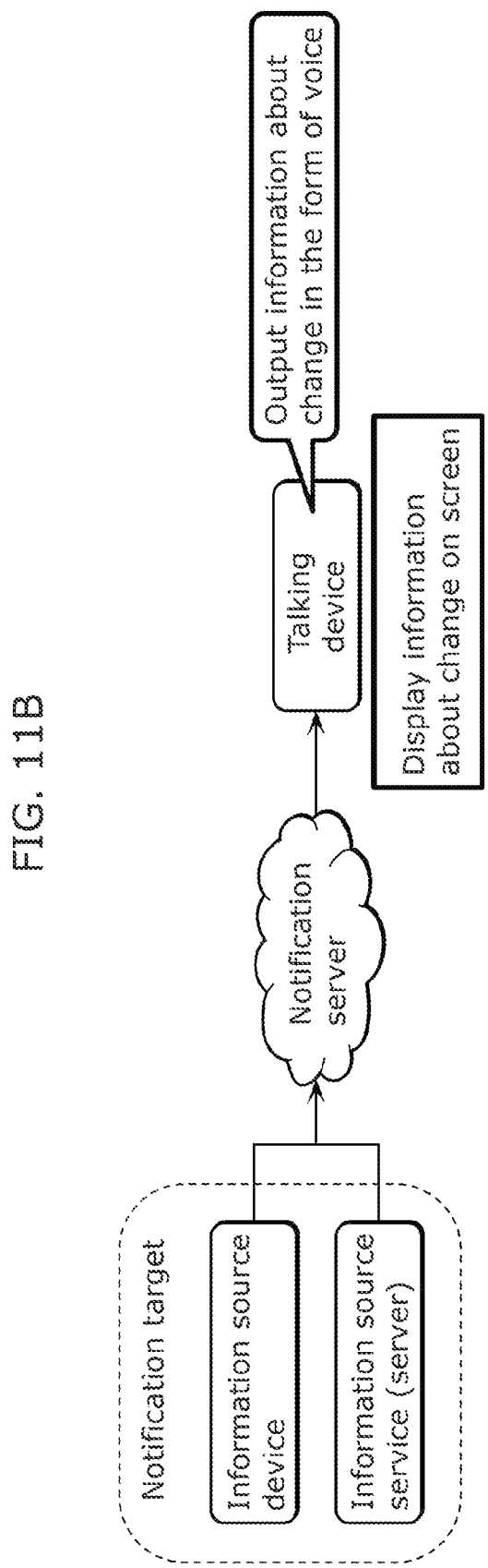
FIG. 11B is a diagram showing an example of the details of a voice message and display to be provided when a change is detected.

FIG. 11B is a diagram showing an example of the details of a voice message and display to be provided when a change is detected.

As shown in FIG. 11A, the notification server detects a change regarding the notification details or a change regarding the notification methods (step S181), and gives a voice message instruction to the talking device to provide a voice message indicating information about such change (step S182).

In response to this, the talking device provides a voice message indicating the information about the change (step S183) and displays, on the display device, such information about the change in the form of text, image, or video (step S184). As shown in FIG. 11B, for example, the talking device outputs the information about the change in the form of voice and displays the information about the change on the screen. Note that the voice message and the screen display may be provided simultaneously. Alternatively, the screen display may be performed after the voice message is provided, or the voice message may be provided after the screen display is performed.

Note that each talking device is not required to include a display device, and thus a notification of the information about the change may be provided in the form of text, image, or video from a display device provided around the talking device.

Also, as described above, when a change regarding the notification details or a change regarding the notification methods is detected and the presence of a person around a talking device is detected, notifier 12 may cause the talking device to provide a voice notification of information relating to the change regarding the notification details or the change regarding the notification methods. This will be described with reference to FIG. 12A and FIG. 12B.

Figure 12A:
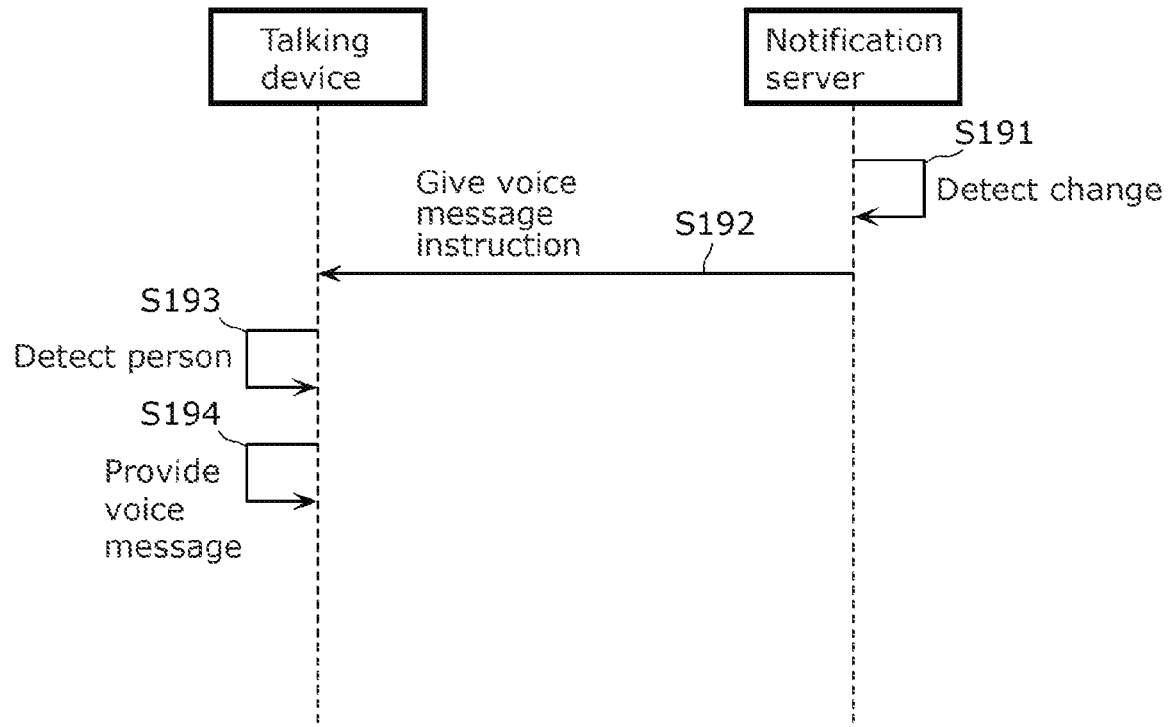
FIG. 12A is a sequence diagram showing an example of the operations performed by the notification server and a talking device, when a change is detected, in accordance with the detection of a person.
Figure 12B:
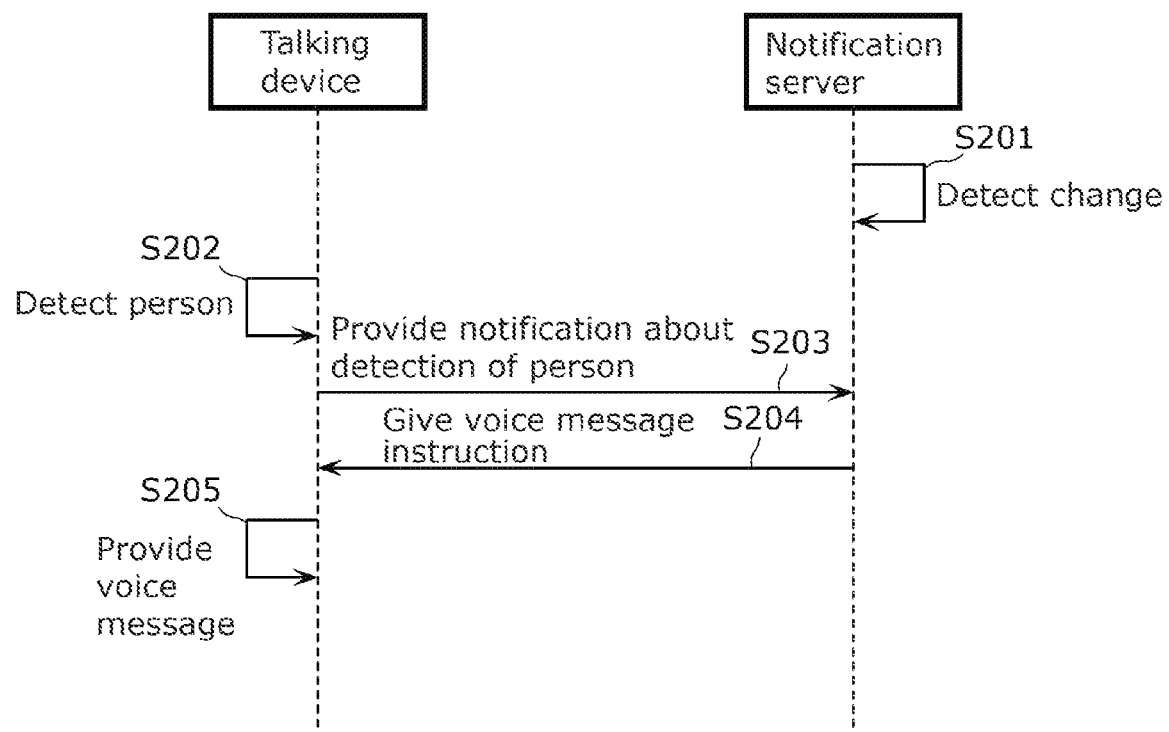
FIG. 12B is a sequence diagram showing an example of the operations performed by the notification server and a talking device, when a change is detected, in accordance with the detection of a person.

FIG. 12A and FIG. 12B are sequence diagrams, each showing an example of the operations performed by the notification server and a talking device, when a change is detected, in accordance with the detection of a person.

As shown in FIG. 12A, the notification server detects a change regarding the notification details or a change regarding the notification methods (step S191), and gives a voice message instruction to the talking device to provide a voice message indicating information about such change (step S192).

After receiving the voice message instruction, the talking device waits until a person around the talking device is detected. When a person is detected (step S193), the talking device provides a voice message indicating the information about the change (step S194).

As shown in FIG. 12B, for example, the notification server detects a change regarding the notification details or a change regarding the notification methods (step S201). At this point in time, the notification server may not give a voice message instruction to the talking device to provide a voice message indicating the information about such change.

When a person is detected (step S202), the talking device notifies the notification server of that a person has been detected (step S203). After the change regarding the notification details or the change regarding the notification methods is detected, the notification server waits until being notified of that a person is detected. Upon receipt of that notification that a person is detected, the notification server gives a voice message instruction to the talking device to provide a voice message indicating the information about the change (step S204).

In response to this, the talking device provides a voice message indicating the information about the change (step S205).

As described above, the notification server may give a voice message instruction immediately after a change regarding the notification details or a change regarding the notification methods is detected. The notification server may also wait until being notified of that a person is detected after the change is detected and give a voice message instruction upon receipt of the notification that a person has been detected. When the notification server gives a voice message instruction immediately after a change regarding the notification details or a change regarding the notification methods is detected, the talking device waits until a person around the talking device is detected.

As described above, voice notification system 1 is a system that causes a talking device to provide a voice notification of information about a notification target that is an information source device about which information is notified by the talking device or an information source service about which information is notified by the talking device. Voice notification system 1 includes: change detector 11 that detects a change regarding notification details or a change regarding a notification method; and notifier 12 that causes the talking device to provide a voice notification of information about the change regarding the notification details or the change regarding the notification method when the change regarding the notification details or the change regarding the notification method is detected.

With this, when a change regarding the notification details or the notification methods occurs, a voice notification of information about the change regarding the notification details or the change regarding the notification methods is directly provided to the user. This enables the user to easily notice the change regarding the notification details or the change regarding the notification methods.

For example, the change regarding the notification details may include a change regarding the notification target, and the change regarding the notification method may include a change regarding the talking device or a change regarding a voice used for notification.

With this, when a change regarding the notification targets occurs, a voice notification of information about such change regarding the notification targets is provided. This enables the user to easily notice the change regarding the notification targets. Also, when a change regarding the talking devices occurs, a voice notification of information about such change regarding the talking devices is provided. This enables the user to easily notice the change regarding the talking devices. Also, when a change regarding the voice used for notification occurs, a voice notification of information about such change regarding the voice used for notification is provided. This enables the user to easily notice the change regarding the voice used for notification.

For example, when an increase is detected in a total number of notification targets, each of which is the notification target, notifier 12 may cause the talking device to provide a voice notification of information about the increase in the total number of the notification targets, and when a decrease is detected in the total number of the notification targets, notifier 12 may cause the talking device to provide a voice notification of information about the decrease in the total number of the notification targets.

With this, when there is an increase in the number of notification targets, a voice notification of information about the increase in the number of notification targets is provided. This enables the user to easily notice the increase in the number of notification targets. With this, when there is a decrease in the number of notification targets, a voice notification of information about the decrease in the number of notification targets is provided. This enables the user to easily notice the decrease in the number of notification targets.

For example, when no increase is detected in the total number of the notification targets for a predetermined period after the decrease is detected in the total number of the notification targets, notifier 12 may cause the talking device to provide the voice notification of the information about the decrease in the total number of the notification targets.

A temporary network malfunction, etc. can cause repeated decrease and increase in the number of notification targets. In such a case, when voice notifications of information about increase and decrease in the number of notification targets are frequently provided to the user every time such increase and decrease occur, the user can feel bothersome. In view of this, a voice notification of information about a decrease in the number of notification targets is provided when no increase in the number of notification targets is detected for a predetermined period after the decrease in the number of notification targets is detected. With this, it is possible to prevent voice notifications of the information about increase and decrease in the number of notification targets from being repeatedly provided.

For example, when an increase is detected in a total number of talking devices, each of which is the talking device, notifier 12 may cause at least one of the talking devices after the increase to provide a voice notification of information about the increase in the total number of the talking devices, and when a decrease is detected in the total number of the talking devices, notifier 12 may cause at least one of the talking devices after the decrease to provide a voice notification of information about the decrease in the total number of the talking devices.

With this, when there is an increase in the number of talking devices, a voice notification of information about the increase in the number of talking devices is provided. This enables the user to easily notice the increase in the number of talking devices. Also, when there is a decrease in the number of talking devices, a voice notification of information about the decrease in the number of talking devices is provided. This enables the user to easily notice the decrease in the number of talking devices.

For example, when no increase is detected in the total number of the talking devices for a predetermined period after the decrease is detected in the total number of the talking devices, notifier 12 may cause the at least one of the talking devices after the decrease to provide the voice notification of the information about the decrease in the total number of the talking devices.

A temporary network malfunction, etc., for example, can cause repeated decrease and increase in the number of talking devices. In such a case, when voice notifications of information about increase and decrease in the number of talking devices are frequently provided to the user every time such increase and decrease occur, the user can feel bothersome. In view of this, a voice notification of information about a decrease in the number of talking devices is provided when no increase in the number of talking devices is detected for a predetermined period after the decrease in the number of talking devices is detected. With this, it is possible to prevent voice notifications of the information about increase and decrease in the number of talking devices from being repeatedly provided.

For example, when a change regarding a voice used for notification is detected, notifier 12 may cause the talking device to provide, using the voice changed, a voice notification of information about the change regarding the voice used for notification.

This enables the user to check to which voice the voice used for notification is to be changed.

For example, a change regarding a voice used for notification may include a change regarding a voice tone, a language, a pitch, a speed, a volume, an accent, or a dialect.

With this, it is possible to provide a voice notification of a change of a voice tone, a language, a pitch, a speed, a volume, an accent, or a dialect as described above.

For example, voice notification system 1 may further include: receiver 13 that receives activation of the change regarding the notification details or the change regarding the notification method. Here, the information about the change regarding the notification details or the change regarding the notification method may include an inquiry about the activation of the change regarding the notification details or the change regarding the notification method.

With this, it is possible to enable the user to notice the change regarding the notification details or the change regarding the notification methods, and inquire the user about activation of such change.

For example, voice notification system 1 may further include: person detector 14 that detects whether a person is present around the talking device. Here, when the change regarding the notification details or the change regarding the notification method is detected under a condition that a person around the talking device is detected, notifier 12 may cause the talking device to provide the voice notification of the information about the change regarding the notification details or the change regarding the notification method.

When a talking device provides a voice notification of information about a change regarding the notification details or a change regarding the notification methods when no person is present around the talking device, for example, the user fails to hear such notification in some cases. In view of this, the talking device provides a voice notification of information about a change regarding the notification details or a change regarding the notification methods when the presence of a person around the talking device is detected. This enables the user to more easily notice the change regarding the notification details or the change regarding the notification methods.

For example, when the change regarding the notification details or the change regarding the notification method is detected, notifier 12 may further cause a display device to provide, in a form of text, image, or video, a notification of the information about the change regarding the notification details or the change regarding the notification method.

With this, information about a change regarding the notification details or a change regarding the notification methods is notified in the form of text, image, or video in addition to voice. This enables the user to more easily notice the change regarding the notification details or the change regarding the notification methods.

Other Embodiments

The embodiment has been described above to illustrate the technology disclosed in the present application. However, the technology in the present disclosure is not limited thereto and thus modification, replacement, addition, omission, and so forth can be applied to the embodiment where appropriate. Also, elements described in the foregoing embodiment can be combined to serve as a new embodiment.

For example, the foregoing embodiment describes an example in which voice notification system 1 includes receiver 13, but voice notification system 1 may not include receiver 13. In this case, information about a change regarding the notification details or a change regarding the notification methods may not include an inquiry about activation of the change regarding the notification details or the change regarding the notification methods.

For example, the foregoing embodiment describes an example in which voice notification system 1 includes person detector 14, but voice notification system 1 may not include person detector 14. In this case, when a change regarding the notification details or a change regarding the notification methods is detected, notifier 12 may cause a talking device to provide a voice notification of information about the change regarding the notification details or the change regarding the notification methods regardless of whether a person is present around the talking device.

The present disclosure can be implemented, for example, not only as voice notification system 1, but also as a voice notification method that includes the steps (processes) performed by the elements of voice notification system 1.

More specifically, such voice notification method is a method of causing a talking device to provide a voice notification of information about a notification target that is an information source device about which information is notified by the talking device or an information source service about which information is notified by the talking device. As shown in FIG. 3, such voice notification method includes: detecting a change regarding notification details or a change regarding a notification method (step S11); and causing the talking device to provide a voice notification of information about the change regarding the notification details or the change regarding the notification method when the change regarding the notification details or the change regarding the notification method is detected (step S13).

The present disclosure can be implemented, for example, as a program that causes a processor to execute the steps included in the voice notification method. The present disclosure can be further implemented as a non-transitory computer-readable recording medium, such as a CD-ROM, having recorded thereon such program.

When the present disclosure is implemented as a program (software), for example, the steps are executed by the program being executed using hardware resources of a computer, such as a CPU, a memory, and an input-output circuit. Stated differently, the steps are executed by the CPU obtaining data from the memory, the input-output circuit, or another hardware resource to perform calculations, and outputting calculation results to the memory, the input-output circuit, or another hardware resource.

Each of the elements included in voice notification system 1 in the foregoing embodiment may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory.

Note that some or all of the functions of voice notification system 1 according to the foregoing embodiment may be implemented as an LSI, which is typically an integrated circuit. These functions may take the form of individual chips, or some or all of the functions may be encapsulated into a single chip. IC integration is not limited to LSI. Each of the functions thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

The embodiment has been described above to illustrate the technology according to the present disclosure, for which the accompanying drawings and a detailed description have been provided.

The elements described in the accompanying drawings and detailed descriptions can thus include not only the elements essential to solve the problem, but also elements not essential to solve the problem. Therefore, these elements should not be construed as being essential because of that they are illustrated in the accompanying drawings and detailed descriptions.

Also note that the foregoing embodiment is intended to illustrate the technology according to the present disclosure, and thus allow for various modifications, replacements, additions, omissions, and so forth made thereto within the scope of the claims and its equivalent scope.

INDUSTRIAL APPLICABILITY

The present disclosure is applicable to a system that provides a voice notification of information about the status, etc. of a device.

The invention claimed is:

1. A voice notification system that causes a talking device, of at least one talking devices, to provide a voice notification of information about a notification target, of at least one notification targets, that is an information source device about which information is notified by the talking device or an information source service about which information is notified by the talking device, the voice notification system comprising:
   a change detector that detects a change regarding notification details or a change regarding a notification method; and
   a notifier that causes the talking device to provide a voice notification of information about the change regarding the notification details or the change regarding the notification method when the change regarding the notification details or the change regarding the notification method is detected,
   wherein the notifier further performs at least one of:
   (i) when an increase is detected in a total number of the at least one notification targets, each of which is the notification target, causing the talking device to provide a voice notification of information about the increase in the total number of the at least one notification targets, and when a decrease is detected in the total number of the at least one notification targets, causing the talking device to provide a voice notification of information about the decrease in the total number of the at least one notification targets; or
   (ii) when an increase is detected in a total number of the at least one talking devices, each of which is the talking device, causing at least one of the at least one talking devices after the increase to provide a voice notification of information about the increase in the total number of the at least one talking devices, and when a decrease is detected in the total number of the at least one talking devices, causing at least one of the at least one talking devices after the decrease to provide a voice notification of information about the decrease in the total number of the at least one talking devices.

2. The voice notification system according to claim 1, wherein the change regarding the notification details includes a change regarding the notification target, and the change regarding the notification method includes a change regarding the talking device or a change regarding a voice used for notification.

3. The voice notification system according to claim 1, wherein when no increase is detected in the total number of the at least one notification targets for a predetermined period after the decrease is detected in the total number of the at least one notification targets, the notifier causes the talking device to provide the voice notification of the information about the decrease in the total number of the at least one notification targets.

4. The voice notification system according to claim 1, wherein when no increase is detected in the total number of the at least one talking devices for a predetermined period after the decrease is detected in the total number of the at least one talking devices, the notifier causes the at least one of the talking devices after the decrease to provide the voice notification of the information about the decrease in the total number of the at least one talking devices.

5. The voice notification system according to claim 1, wherein when a change regarding a voice used for the voice notification is detected, the notifier causes the talking device to provide, using the voice changed, the voice notification of information about the change regarding the voice used for the voice notification.

6. The voice notification system according to claim 1, wherein a change regarding a voice used for the voice notification includes a change regarding a voice tone, a language, a pitch, a speed, a volume, an accent, or a dialect.

7. The voice notification system according to claim 1, further comprising:
a receiver that receives activation of the change regarding the notification details or the change regarding the notification method,
wherein the information about the change regarding the notification details or the change regarding the notification method includes an inquiry about the activation of the change regarding the notification details or the change regarding the notification method.

8. The voice notification system according to claim 1, further comprising:
a person detector that detects whether a person is present around the talking device,
wherein when the change regarding the notification details or the change regarding the notification method is detected under a condition that a person around the talking device is detected, the notifier causes the talking device to provide the voice notification of the information about the change regarding the notification details or the change regarding the notification method.

9. The voice notification system according to claim 1, wherein when the change regarding the notification details or the change regarding the notification method is detected, the notifier further causes a display device to provide, in a form of text, image, or video, a notification of the information about the change regarding the notification details or the change regarding the notification method.

10. A voice notification method of causing a talking device, of at least one talking devices, to provide a voice notification of information about a notification target, of at least one notification targets, that is an information source device about which information is notified by the talking device or an information source service about which information is notified by the talking device, the voice notification method comprising:
detecting a change regarding notification details or a change regarding a notification method; and
causing the talking device to provide a voice notification of information about the change regarding the notification details or the change regarding the notification method when the change regarding the notification details or the change regarding the notification method is detected,
wherein the causing further includes at least one of:
(i) when an increase is detected in a total number of the at least one notification targets, each of which is the notification target, causing the talking device to provide a voice notification of information about the increase in the total number of the at least one notification targets, and when a decrease is detected in the total number of the at least one notification targets, causing the talking device to provide a voice notification of information about the decrease in the total number of the at least one notification targets; or
(ii) when an increase is detected in a total number of the at least one talking devices, each of which is the talking device, causing at least one of the talking devices after the increase to provide a voice notification of information about the increase in the total number of the at least one talking devices, and when a decrease is detected in the total number of the at least one talking devices, causing at least one of the talking devices after the decrease to provide a voice notification of information about the decrease in the total number of the at least one talking devices.

11. A non-transitory computer-readable recording medium having recorded thereon a program for causing a computer to execute the voice notification method which causes a talking device, of at least one talking devices, to provide a voice notification of information about a notification target, of at least one notification targets, that is an information source device about which information is notified by the talking device or an information source service about which information is notified by the talking device, the voice notification method comprising:
detecting a change regarding notification details or a change regarding a notification method; and
causing the talking device to provide a voice notification of information about the change regarding the notification details or the change regarding the notification method when the change regarding the notification details or the change regarding the notification method is detected,
wherein the causing further includes at least one of:
(1) when an increase is detected in a total number of the at least one notification targets, each of which is the notification target, causing the talking device to provide a voice notification of information about the increase in the total number of the at least one notification targets, and when a decrease is detected in the total number of the at least one notification targets, causing the talking device to provide a voice notification of information about the decrease in the total number of the at least one notification targets; or
(ii) when an increase is detected in a total number of the at least one talking devices, each of which is the talking device, causing at least one of the talking devices after the increase to provide a voice notification of information about the increase in the total number of the at least one talking devices, and when a decrease is detected in the total number of the at least one talking devices, causing at least one of the talking devices after the decrease to provide a voice notification of information about the decrease in the total number of the at least one talking devices.

* * * * *